United States Patent [19]

Kanno et al.

[11] Patent Number: 5,002,362

[45] Date of Patent: Mar. 26, 1991

[54] PLASTIC OPTICAL FIBER

[75] Inventors: Tatsuya Kanno; Ikuo Takahashi; Kenichi Sasaki, all of Hyogo, Japan

[73] Assignee: Daicel Chemical Industries, Ltd., Sakai, Japan

[21] Appl. No.: 423,345

[22] Filed: Oct. 18, 1989

[30] Foreign Application Priority Data

May 1, 1987 [JP] Japan .................................. 62-108562
Oct. 9, 1987 [JP] Japan .................................. 62-256103

[51] Int. Cl.$^5$ .............................................. G02B 1/04
[52] U.S. Cl. .................................................. 350/96.34
[58] Field of Search ................ 350/96.10, 96.29–96.34

[56] References Cited

U.S. PATENT DOCUMENTS

| | | | |
|---|---|---|---|
| 4,783,544 | 11/1988 | Yokoshima et al. | 350/96.29 X |
| 4,798,445 | 1/1989 | Yamamoto et al. | 350/96.34 |
| 4,843,111 | 6/1989 | Yokoshima et al. | 350/96.29 X |
| 4,844,578 | 7/1989 | Pierini et al. | 350/96.34 |
| 4,919,514 | 4/1990 | Ebert et al. | 350/96.34 |

Primary Examiner—John D. Lee
Attorney, Agent, or Firm—Flynn, Thiel, Boutell & Tanis

[57] ABSTRACT

A plastic optical fiber comprising an aromatic polycarbonate copolymer having a photoelastic constant of 60 Brewsters ($10^{-12}$ m$^2$/N) or less as a core component resin exhibits small birefringence.

9 Claims, No Drawings

PLASTIC OPTICAL FIBER

The present invention relates to a plastic optical fiber comprising an aromatic polycarbonate copolymer having a photoelastic constant of 60 Brewsters ($10^{31}$ 12m$^2$/N) or less as a core component resin.

BACKGROUND OF THE INVENTION

A plastic optical fiber has hitherto been used in short-distance transmission systems by virtue of its advantages, such as superiority to a quartz glass fiber in flexibility, even in the case of a large aperture, low loss when connected to a light source because an optical fiber having a light weight and a high numerical aperture can be easily prepared therefrom, and very low cost because it can be massproduced on a commercial scale. However, conventional optical fibers have a drawback in that their transmission loss remarkably increases at a service temperature of 80° C. or above, which limits their application from the viewpoint of the serviceable temperature when the optical fiber is used for automobiles, aircraft, marine vessels, etc. Therefore, a polycarbonate of bisphenol A having a high glass transition temperature and flame retardancy has been used in the above-described applications. However, current polycarbonates cause birefringence when a laser beam is passed through the fiber mainly because of thermal stress, molecular orientation, and residual stress due to change in the volume around the glass transition point caused during the steps of cooling and flowing a resin in the molding of a fiber. An increase in transmission loss due to large optical heterogeneity caused by briefringence is a fatal drawback of a plastic optical fiber.

SUMMARY OF THE INVENTION

The present inventors have made intensive experiments with a view to solving the abovedescribed drawbacks and problems and, as a result, have found that a resin having a small photoelastic constant can be obtained without detriment to the mechanical and thermal characteristics of conventional polycarbonate by selecting two or three bisphenols so as to have a photoelastic constant of 60 Brewsters or less and synthesizing an aromatic polycarbonate through copolymerization of the selected monomers, which has led to the completion of the present invention. The birefringence caused mainly by thermal stress, molecular orientation, and residual stress during the steps of cooling and flowing a resin in the molding of a plastic optical fiber can be reduced also by suitably selecting the conditions of molding of the optical fiber. However, the birefringence of an optical fiber greatly depends upon the inherent birefringence of the resin per se, that is, photoelastic constant. The birefringence can be expressed as a product of a photoelastic constant and a residual stress by the following equation (1):

$$n_1 - n_2 = C(\sigma_1 - \sigma_2) \quad (1)$$

wherein $n_1 - n_2$: birefringence,
$\sigma_1 - \sigma_2$: residual stress, and
C : photoelastic constant.

It is apparent that a decrease in the photoelastic constant in the equation (1) leads to a decrease in the birefringence of the resultant optical fiber even when the optical fiber is formed under the same molding conditions. The present invention provides a plastic optical fiber comprising an aromatic polycarbonate copolymer having a photoelastic constant of 60 Brewsters or less as a core component resin. Accordingly, the present invention relates to a plastic optical fiber wherein an aromatic polycarbonate copolymer is prepared from two or three monomers selected from among bisphenols represented by the following general formulae (I), (II), and (III) and which has a photoelastic constant of 60 Brewsters or less is used as a core component resin:

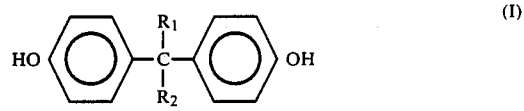

wherein $R_1$ and $R_2$ are each hydrogen, a straightchain or branched alkyl group having 1 to 6 carbon atoms, a cyclohexane ring, or an aromatic hydrocarbon group;

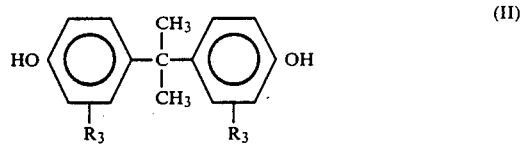

wherein $R_3$ is a methyl, ethyl, n-propyl, iso-propyl, or tert-butyl group; and

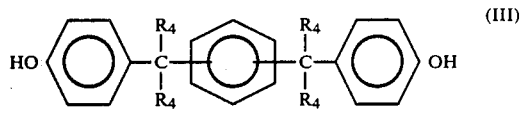

wherein $R_4$ is a straight-chain or branched alkyl group having 1 to 6 carbon atoms.

In the present invention, it is also possible to use a copolymer prepared from two or three monomers selected from among those represented by the formulae (IV), (II), and (III) wherein monomer (IV) is used instead of monomer (I):

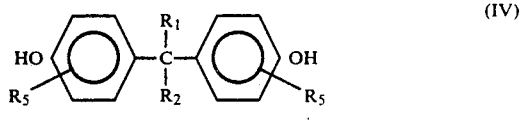

wherein $R_1$ and $R_2$ are each hydrogen or a straightchain or branched alkyl group having 1 to 6 carbon atoms, a cyclohexane ring or an aromatic hydrocarbon group and $R_5$ is a tert-butyl group.

DETAILED DESCRIPTION OF THE INVENTION

Examples of the bisphenol compound having the general formula (I) include bis(4-hydroxyphenyl)methane, 1,1-bis(4-hydroxyphenyl)ethane, 1,1-bis(4-hydroxyphenyl)propane, 2,2-bis(4-hydroxyphenyl)propane (bisphenol A), 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 4,4-dihydroxy-2,2,2-triphenylethane, 1,1-bis(4-hydroxyphenyl)cyclohexane, and 2,2-bis(4-hydroxy-3-chlorophenyl)propane. Examples of the bisphenol compound having the general formula (II) include 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3-secbutylphenyl)propane, and 2,2-bis(4-hydroxy-3-tertbutylphenyl)propane. Examples of the bisphenol compound having the general formula (III) include 1,1-bis(4-hydroxyphenyl)-p-diisopropylbenzene and 1,1-bis(4-hydroxyphenyl)-m-diisopropylbenzene.

Examples of the bisphenol compound having the general formula (IV) include bis(4-hydroxyphenyl)methane, 1,1-bis(4-hydroxyphenyl)methane, 1,1-bis(4-hydroxyphenyl)propane, 2,2-bis(4-hydroxyphenyl)propane (bisphenol A), 2,2-bis(4-hydroxyphenyl)butane, 2,2-bis(4-hydroxyphenyl)pentane, 2,2-bis(4-hydroxyphenyl)-3-methylbutane, 2,2-bis(4-hydroxyphenyl)hexane, 2,2-bis(4-hydroxyphenyl)-4-methylpentane, 4,4'-dihydroxy-2,2,2-triphenylethane, 1,1-bis(4-hydroxyphenyl)cyclohexane, 2,2-bis(4-hydroxy-3-chlorophenyl)propane, 2,2-bis(4-hydroxy-3-tertbutylphenyl)-2-phenylethane, and 1,1-bis(4-hydroxy-3-tert-butylphenyl)cyclohexane.

It is preferred that the copolymer of the present invention have a viscosity-average molecular weight of 13,000 to 30,000 in terms of bisphenol A polycarbonate. When the molecular weight is less than 13,000, the copolymer becomes fragile. On the other hand, when it exceeds 30,000, the melt fluidity becomes poor, which makes the moldability poor. The polycarbonate copolymer of the present invention can be prepared by a method which comprises transesterification between diphenyl carbonate and two or three monomers selected from among those represented by the general formulae (I), (II), and (III) followed by melt-polycondensation or a method wherein an interfacial polymerization or a solution polymerization is conducted by making use of phosgene.

The birefringence of an optical fiber comprising an aromatic polycarbonate copolymer as a core component resin is 5 to 10 nm in a single path, while that of bisphenol A polycarbonate is 20 to 40 nm in a single path. That is, the optical fiber comprising an aromatic polycarbonate copolymer as a core component resin exhibits very small birefringence.

The present invention will now be described by way of Examples which should not be construed as limiting the scope of the present invention. The viscosity-average molecular weight in the following Examples is a molecular weight in terms of bisphenol A polycarbonate determined by measuring the intrinsic viscosity $[\eta]$ of a solution of the polymer in methylene chloride at 20° C. and calculating the viscosity-average molecular weight ($\overline{M}v$) from the intrinsic viscosity by making use of the following equation showing the relationship between the intrinsic viscosity $[\eta]$ and the molecular weight $[\overline{M}v]$[cf. E. Müller and O. Bayer, USP 2,999,844 (1961)]:

$$[\eta] = 1.11 \times 10^{31\,4} \overline{M}v^{0.82}$$

EXAMPLES

EXAMPLE 1

A 3-λ three-necked flask was charged with 116 parts by weight (40% by mole) of 2,2-bis(4-hydroxyphenyl)-butane, 209 parts by weight (60% by mole) of 4,4-dihydroxy-2,2,2-triphenylethane, and 264 parts by weight of diphenyl carbonate. Deaeration and purging with a nitrogen gas were repeated five times. The mixture was melted in a silicone bath at 160° C. while introducing a nitrogen gas thereinto. After the completion of the melting, a solution of potassium borohydride as a carbonation catalyst in phenol (in an amount of $10^{31\,3}\%$ by mole based on the total amount of the bisphenols fed) was added to the molten mixture, and the mixture was stirred in a nitrogen atmosphere at 160° C. for 30 min for maturing. Then the system was evacuated to 100 Torr at the same temperature and stirred for 30 min. Further, the system was evacuated to 50 Torr and the reaction was allowed to proceed for 60 min. The reaction mixture was gradually heated to 220° C. and then allowed to react at that temperature for 60 min. 80% of the theoretical amount of phenol to be distilled was distilled away in the reaction up to this stage. Thereafter, the system was evacuated to 10 Torr at the same temperature and the reaction was allowed to proceed for 30 min. The temperature was gradually raised to 270° C. and the reaction was allowed to proceed at that temperature for 30 min. The system was evacuated to 5 Torr at that temperature and the reaction was allowed to proceed at that temperature for 30 min, thereby distilling away phenol in an amount substantially corresponding to the theoretical amount of phenol to be distilled. Thus the step of precondensation was completed. Subsequently, condensation was conducted at the same temperature under a pressure of 0.1 to 0.3 Torr for 2 hr. The resultant polymer as a product was taken out in a nitrogen atmosphere and allowed to cool. The solution viscosity of the polymer was determined at 20° C. using dichloromethane as a solvent. The viscosity-average molecular weight $\overline{M}v$) of the polymer was calculated based on the value thus obtained and found to be 25,000. The glass transition point (Tg) was measured with a DSC (differential scanning calorimeter; model Perkin-Elmer 2C) and found to be 162° C. Further the photoelastic constant (C) was measured and found to be 57 Brewsters. Regarding the instruments used in the measurements, the glass transition point was measured with a DSC (model Perkin-Elmer 2C). The photoelastic constant was measured by making use of an instrument prepared by the present inventors for this purpose and calculated by applying tensile stresses having different magnitudes to a test piece (50mm × 10mm × 1 mm) in the lengthwise direction, measuring the resultant birefringence, substituting each value for the above-described equation (1), and determining the photoelastic constant from the slope. Incidentally the photoelastic constant (C) of a polycarbonate of 2,2-bis(4-hydroxyphenyl)propane was 82 Brewsters.

EXAMPLES 2 to 46

Polycarbonate copolymers were synthesized in the same manner as that of Example 1 and subjected to measurements of viscosity-average molecular weight ($\overline{M}v$), photoelastic constant (C), and glass transition point (Tg). The results are shown in Table 1.

TABLE 1

| Ex. No. | Bisphenol A | Bisphenol B | Bisphenol C | Mol % (A/B) | Viscosity-average molecular weight ($\overline{MV}$) | Photoelastic constant ($10^{-12}$ m$^2$/N) (C) | Glass transition point (°C.) (Tg) |
|---|---|---|---|---|---|---|---|
| 2 | 1,1-bis(4-hydroxyphenyl)cyclohexane (H-center) | 1,1,1-triphenyl-1-(4-hydroxyphenyl)... bis(4-hydroxyphenyl)diphenylmethane | | 50/50 | 21,000 | 60 | 170 |
| 3 | 2,2-bis(3-methyl-4-hydroxyphenyl)propane | 2,2-bis(3-isopropyl-4-hydroxyphenyl)propane | | 50/50 | 27,000 | 55 | 107 |
| 4 | 1,1-bis(4-hydroxyphenyl)cyclohexane | 2,2-bis(3-isopropyl-4-hydroxyphenyl)propane | | 50/50 | 18,800 | 52 | 124 |
| 5 | 1,1-bis(4-hydroxyphenyl)cyclohexane | 2,2-bis(3-isopropyl-4-hydroxyphenyl)propane | | 50/50 | 18,000 | 48 | 110 |
| 6 | 1,1-bis(4-hydroxyphenyl)cyclohexane | α,α'-bis(4-hydroxyphenyl)-1,4-diisopropylbenzene | | 50/50 | 18,000 | 56 | 134 |
| 7 | triphenyl(4-hydroxyphenyl)methane derivative | 2,2-bis(3-isopropyl-4-hydroxyphenyl)propane | | 50/50 | 21,000 | 45 | 121 |

TABLE 1 -continued

| Ex. No. | Bisphenol A | B | C | Mol % (A/B) | Viscosity-average molecular weight ($\overline{MV}$) | Photoelastic constant ($10^{-12}$ m²/N) (C) | Glass transition point (°C.) (Tg) |
|---|---|---|---|---|---|---|---|
| 8 | | | | 50/50 | 19,600 | 60 | 167 |
| 9 | | | | 50/50 | 19,500 | 51 | 131 |
| 10 | | | | 70/30 | 16,000 | 50 | 155 |
| 11 | | | | 60/40 | 17,800 | 60 | 167 |
| 12 | | | | 60/40 | 17,000 | 57 | 166 |
| 13 | | | | 50/50 | 22,000 | 53 | 118 |

TABLE 1 -continued

| Ex. No. | Bisphenol A | Bisphenol B | Bisphenol C | Mol % (A/B) | Viscosity-average molecular weight ($\overline{MV}$) | Photoelastic constant ($10^{-12}$ m²/N) (C) | Glass transition point (°C) (Tg) |
|---|---|---|---|---|---|---|---|
| 14 | (structure) | (structure) | | 50/50 | 21,000 | 47 | 103 |
| 15 | (structure) | (structure) | | 50/50 | 20,500 | 59 | 170 |
| 16 | (structure) | (structure) | | 60/40 | 19,700 | 49 | 145 |
| 17 | (structure) | (structure) | | 50/50 | 20,000 | 55 | 122 |
| 18 | (structure) | (structure) | | 50/50 | 18,000 | 56 | 134 |
| 19 | (structure) | (structure) | | 50/50 | 23,000 | 47 | 132 |
| 20 | (structure) | (structure) | | 50/50 | 19,000 | 40 | 122 |

TABLE 1 -continued

| Ex. No. | Bisphenol A | Bisphenol B | Bisphenol C | Mol % (A/B) | Viscosity-average molecular weight ($\overline{MV}$) | Photoelastic constant ($10^{-12}$ m²/N) (C) | Glass transition point (°C) (Tg) |
|---|---|---|---|---|---|---|---|
| 21 | [structure] | [structure] | | 50/50 | 20,800 | 39 | 137 |
| 22 | [structure] | [structure] | | 50/50 | 21,500 | 38 | 144 |
| 23 | [structure] | [structure] | | 50/50 | 24,000 | 41 | 135 |
| 24 | [structure] | [structure] | | 50/50 | 19,800 | 38 | 111 |
| 25 | [structure] | [structure] | | 70/30 | 16,000 | 38 | 144 |
| 26 | [structure] | [structure] | | 50/50 | 19,500 | 48 | 130 |

TABLE 1 -continued

| Ex. No. | Bisphenol A | Bisphenol B | Bisphenol C | Mol % (A/B) | Viscosity-average molecular weight ($\overline{MV}$) | Photoelastic constant ($10^{-12}$ m²/N) (C) | Glass transition point (°C) (Tg) |
|---|---|---|---|---|---|---|---|
| 27 | [structure] | [structure] | | 50/50 | 18,000 | 43 | 128 |
| 28 | [structure] | [structure] | | 50/50 | 18,000 | 48 | 103 |
| 29 | [structure] | [structure] | [structure] | 30/30/40 | 23,500 | 57 | 132 |
| 30 | [structure] | [structure] | [structure] | 10/10/80 | 19,000 | 58 | 173 |
| 31 | [structure] | [structure] | [structure] | 50/10/40 | 18,100 | 57 | 132 |
| 32 | [structure] | [structure] | [structure] | 50/10/40 | 18,900 | 56 | 135 |

TABLE 1 -continued

| Ex. No. | Bisphenol A | Bisphenol B | Bisphenol C | Mol % (A/B) | Viscosity-average molecular weight ($\overline{MV}$) | Photoelastic constant ($10^{-12}$ m$^2$/N) (C) | Glass transition point (°C) (Tg) |
|---|---|---|---|---|---|---|---|
| 33 | (cyclohexylidene bisphenol) | 2,2-bis(4-hydroxyphenyl)propane | 1,1-bis(3-hydroxy-4-... with C(CH$_3$)$_3$ groups | 30/30/40 | 19,800 | 47 | 138 |
| 34 | (cyclohexylidene bisphenol) | 2,2-bis(4-hydroxyphenyl)propane-like | same C type | 50/30/20 | 19,800 | 49 | 132 |
| 35 | 1,1,1-tris(4-hydroxyphenyl)ethane | 1,1,1-tris(4-hydroxyphenyl)ethane | same C type | 20/30/50 | 22,000 | 41 | 139 |
| 36 | 1,1,1-tris(4-hydroxyphenyl)ethane | cyclohexylidene bisphenol | same C type | 20/30/50 | 18,000 | 40 | 141 |
| 37 | tetramethyl bisphenol | cyclohexylidene bisphenol | same C type | 30/20/50 | 19,800 | 43 | 137 |
| 38 | tetramethyl bisphenol | 2,2-bis(4-hydroxyphenyl)propane | same C type | 30/20/50 | 23,000 | 44 | 134 |

TABLE 1-continued

| Ex. No. | Bisphenol A | Bisphenol B | Bisphenol C | Mol % (A/B) | Viscosity-average molecular weight ($\overline{M}V$) | Photoelastic constant ($10^{-12}$ m$^2$/N) (C) | Glass transition point (°C.) (Tg) |
|---|---|---|---|---|---|---|---|
| 39 | [bisphenol with C(CH$_3$)$_2$ and C(CH$_3$)(C$_6$H$_5$)] | [bisphenol with C(CH$_3$)(C$_6$H$_5$)] | [bisphenol with two C(CH$_3$)$_3$ ortho groups] | 10/70/20 | 24,900 | 57 | 133 |
| 40 | [same A] | [bisphenol with C(CH$_3$)$_2$] | [bisphenol with two C(CH$_3$)$_3$ ortho groups] | 20/50/30 | 21,000 | 48 | 132 |
| 41 | [same A] | [bisphenol with C(CH$_3$)(C$_6$H$_5$)] | [bisphenol with two C(CH$_3$)$_3$ ortho groups] | 20/50/30 | 19,800 | 43 | 141 |
| 42 | [same A] | [bisphenol with C(CH$_3$)$_2$] | [bisphenol with C(CH$_3$)$_2$] | 40/40/20 | 24,000 | 59 | 128 |
| 43 | [same A] | [bisphenol with C(CH$_3$)$_2$] | [bisphenol with C(CH$_3$)(C$_6$H$_5$)] | 40/30/30 | 20,300 | 54 | 136 |
| 44 | [same A] | [bisphenol with C(CH$_3$)$_2$] | [bisphenol with C(C$_6$H$_5$)$_2$] | 40/20/40 | 24,000 | 53 | 135 |

TABLE 1-continued

| Ex. No. | Bisphenol A | Bisphenol B | C | Mol % (A/B) | Viscosity-average molecular weight ($\overline{MV}$) | Photoelastic constant ($10^{-12}$ m$^2$/N) (C) | Glass transition point (°C.) (Tg) |
|---|---|---|---|---|---|---|---|
| 45 | [structure with CH₃ groups and OH] | [bisphenol with CH₃ groups] | [structure with CH₃, phenyl and OH] | 40/20/40 | 23,000 | 43 | 145 |
| 46 | [structure with CH₃ groups and OH] | [bisphenol with CH₃ groups] | [structure with CH₃, phenyl and OH] | 10/10/80 | 23,800 | 58 | 172 |

EXAMPLE 47

A 3-λ three-necked flask was charged with 207 parts by weight (50% by mole) of 2,2-bis(4-hdyroxy-3-tert-butylphenyl)-2-phenylethane, 137 parts by weight (50% by mole) of 2,2-bis(4-hydroxyphenyl)propane, and 264 parts by weight of diphenyl carbonate. Deaeration and purging with a nitrogen gas were repeated five times. The mixture was melted in a silicone bath at 160° C. while introducing a nitrogen gas thereinto. After the completion of the melting, a solution of potassium borohydride as a carbonation catalyst in phenol (in an amount of $10^{31\ 3}$% by mole based on the total amount of the bisphenols fed) was added to the molten mixture and the mixture was stirred in a nitrogen atmosphere at 160° C. for 30 min for maturing. Then the system was evacuated to 100 Torr at the same temperature and stirred for 30 min. Further the system was evacuated to 50 Torr and the reaction was allowed to proceed for 60 min. The reaction mixture was gradually heated to 220° C. and then allowed to react at that temperature for 60 min. 80% of the theoretical amount of phenol to be distilled was distilled away in the reaction up to this stage. Thereafter the system was evacuated to 10 Torr at the same temperature and the reaction was allowed to proceed for 30 min. The temperature was gradually raised to 270° C. and the reaction was allowed to proceed for 30 min. The system was evacuated to 5 Torr at that temperature and the reaction was allowed to proceed for 30 min, thereby distilling away phenol in an amount substantially corresponding to the theoretical amount of phenol to be distilled. Thus the step of precondensation was completed. Subsequently condensation was conducted at the same temperature under a pressure of 0.1 to 0.3 Torr for 2 hr. The resultant polymer as a product was taken out in a nitrogen atmosphere and allowed to cool. The solution viscosity of the polymer was determined at 20° C. using dichloromethane as a solvent. The viscosity-average molecular weight ($\overline{M}v$) of the polymer was calculated based on the value thus obtained and found to be 18,000. The glass transition point (Tg) was measured with a DSC (model Perkin-Elmer 2C) and found to be 143° C. Further the photoelastic constant (C) was measured and found to be 50 Brewsters. Regarding the instruments used in the measurements, the glass transition point was measured with a DSC (model Perkin-Elmer 2C). The photoelastic constant was measured by making use of an instrument prepared by the present inventors for this purpose and calculated by applying tensile stresses having different magnitudes to a test piece (50mm × 10mm × 1 mm) in the lengthwise direction, measuring the resultant birefringence, substituting each value for the abovedescribed equation (1), and determining the photoelastic constant from the slope. Incidentally the photoelastic constant (C) of a polycarbonate of 2,2-bis(4-hydroxyphenyl)propane was 82 Brewsters.

EXAMPLE 48

Polycarbonate copolymers were synthesized in the same manner as that of Example 47 and subjected to measurements of viscosity-average molecular weight ($\overline{M}v$), photoelastic constant (C), and glass transition point (Tg). The results are shown in Table 2.

TABLE 2

| Ex. No. | Bisphenol A | Bisphenol B | Mol % (A/B) | Viscosity-average molecular Weight ($\overline{MV}$) | Photoelastic constant ($10^{-12}$ m²/N (C)) | Glass transition point (°C.) (Tg) |
|---|---|---|---|---|---|---|
| 48 | [structure] | [structure] | 50/50 | 24,000 | 40 | 167 |
| 49 | [structure] | [structure] | 50/50 | 25,500 | 38 | 148 |
| 50 | [structure] | [structure] | 50/50 | 26,600 | 36 | 126 |
| 51 | [structure] | [structure] | 50/50 | 23,000 | 46 | 140 |
| 52 | [structure] | [structure] | 50/50 | 27,500 | 36 | 158 |

TABLE 2-continued

| Ex. No. | Bisphenol A | Bisphenol B | Mol % (A/B) | Viscosity-average molecular Weight ($\overline{MV}$) | Photoelastic constant ($10^{-12}$ m²/N) (C) | Glass transition point (°C.) (Tg) |
|---|---|---|---|---|---|---|
| 53 | (bisphenol with cyclohexylidene core, 2,2'-di(isopropyl) substituents, OH groups) | (2,2-bis(4-hydroxyphenyl)propane, bisphenol A) | 50/50 | 21,000 | 38 | 146 |
| 54 | (bisphenol with cyclohexylidene core, 2,2'-di(isopropyl) substituents, OH groups) | (2,2-bis(4-hydroxyphenyl)propane, bisphenol A) | 50/50 | 20,000 | 31 | 120 |

What is claimed is:

1. A plastic optical fiber comprising an aromatic polycarbonate copolymer having a photoelastic constant of 60 Brewsters ($10^{-12} m^2/N$) or less as a core component resin, said copolymer comprising two or three comonomers selected from among those represented by the following formulae (I), (II) and (III):

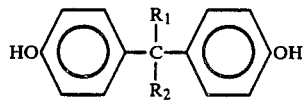
(I)

wherein $R_1$ and $R_2$ are each hydrogen, a straight-chain or branched alkyl group having 1 to 6 carbon atoms, a cyclohexane ring, or an aromatic hydrocarbon group;

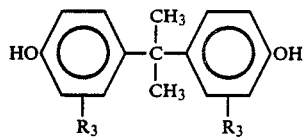
(II)

wherein $R_3$ is a methyl, ethyl, n-propyl, iso-propyl, or tertbutyl group; and

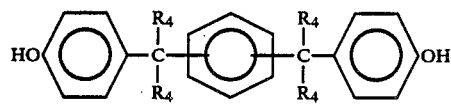
(III)

wherein $R_4$ is a straight-chain or branched alkyl group having 1 to 6 carbon atoms.

2. A plastic optical fiber according to claim 1, wherein said copolymer comprises 2,2-bis(4-hydroxy-3-tert-butylphenyl)propane and 1,1-bis(4-hydroxyphenyl)-m-diisopropylbenzene.

3. A plastic optical fiber according to claim 1, wherein said copolymer comprises 2,2-bis(4-hydroxy-3-tert-butylphenyl)propane and 2,2-bis(4-hydroxy-3,5-methylphenyl)propane.

4. A plastic optical fiber comprising an aromatic polycarbonate copolymer having a photoelastic constant of 60 Brewsters ($10^{-12} m^2/N$) or less as a core component resin, said copolymer comprising two or three comonomers selected from among those represented by the following formulae (IV), (II), and (III):

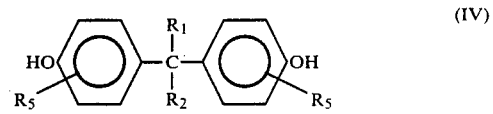
(IV)

wherein $R_1$ and $R_2$ are each hydrogen, a straight-chain or branched alkyl group having 1 to 6 carbon atoms, a cyclohexane ring, or an aromatic hydrocarbon group and $R_5$ is a tert-butyl group;

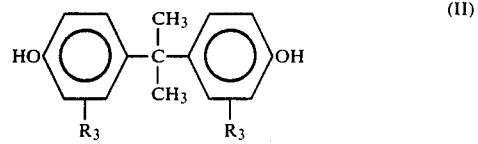
(II)

wherein $R_3$ is a methyl, ethyl, n-propyl, iso-propyl, or tertbutyl group; and

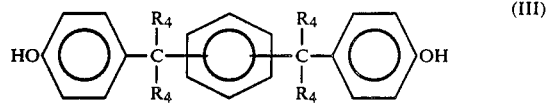
(III)

wherein $R_4$ is a straight-chain or branched alkyl group having 1 to 6 carbon atoms.

5. A plastic optical fiber according to claim 4, wherein said copolymer comprises 4,4'-dihydroxy-3,3'-tert-butyl-2,2,2-triphenylethane and 1,1-bis(4-hydroxyphenyl)-p-diisopropylbenzene.

6. A plastic optical fiber according to claim 4, wherein said copolymer comprises 1,1-bis(4-hydroxy-3-tert-butylphenyl)cyclohexane and 1,1-bis(4-hydroxyphenyl)-p-diisopropylbenzene.

7. A plastic optical fiber according to claim 4, wherein said copolymer comprises 1,1-bis(4-hydroxy-3-tert-butylphenyl)cyclohexane and 4,4'-dihydroxy-2,2,2-triphenylethane.

8. A plastic optical fiber according to claim 4, wherein said copolymer comprises 2,2-bis(4-hydroxy-3-tert-butylphenyl)propane and 1,1-bis(4hydroxyphenyl)-cyclohexane.

9. A plastic optical fiber according to claim 4, wherein said copolymer comprises 2,2-bis(4-hydroxy-3-tert-butylphenyl)propane and 4,4'-dihydroxy-2,2,2-triphenylethane.

* * * * *

UNITED STATES PATENT AND TRADEMARK OFFICE
CERTIFICATE OF CORRECTION

PATENT NO. : 5 002 362
DATED : March 26, 1991
INVENTOR(S) : Tatsuya KANNO et al

It is certified that error appears in the above-identified patent and that said Letters Patent is hereby corrected as shown below:

Column 27, Line 4; change the formula to read as follows:

---$(10^{-12} \ m^2/N)$---.

Column 27, Line 47; change the formula to read as follows:

---$(10^{-12} \ m^2/N)$---.

Column 28, line 44; change "1,1-bis(4hydroxyphenyl) to

---1,1,bis(4-hydroxyphenyl)---.

Signed and Sealed this

Thirteenth Day of October, 1992

*Attest:*

DOUGLAS B. COMER

*Attesting Officer*      *Acting Commissioner of Patents and Trademarks*